Aug. 11, 1964     W. A. STRICKLAND, JR     3,144,146
MIMIC POSITIONING CONTROLLER

Filed Nov. 17, 1960     3 Sheets-Sheet 1

WITNESSES:
Bernard R. Gieguay
James F. Young

INVENTOR
William A. Strickland, Jr.
BY Ernest P. Klipfel
ATTORNEY

United States Patent Office 3,144,146
Patented Aug. 11, 1964

3,144,146
MIMIC POSITIONING CONTROLLER
William A. Strickland, Jr., Columbus, Ohio, assignor to Westinghouse Electric Corporation, East Pittsburgh, Pa., a corporation of Pennsylvania
Filed Nov. 17, 1960, Ser. No. 70,008
11 Claims. (Cl. 214—135)

The present invention relates generally to mimic positioning controllers and more particularly relates to a controller capable of mimicking and directing the position of a device such as a dipper of a power shovel, or the like.

Conventional control systems for power shovels provide separate controlling switches for the hoist, the swing, and the crowd motion. The separate control components must be added vectorially by the operator by continually varying three separate master controlling switch positions. With reference to the dipper, a swing force that causes the dipper to move to the left or to the right is controlled by the feet of the operator. A crowd motion, causing the dipper to move either toward or away from the bank, is controlled by the back or forward movement of one hand of the operator. The hoist motion causes the dipper to move up or down through an arc, as controlled by the back or forward movement of the other hand of the operator. With such a conventional arrangement the shovel operator must vectorially add the separate required hoist, swing and crowd control components in order to, for example, move the dipper in a straight line from a dump position back to a point to continue digging.

It is readily apparent that since over half of any shovel digging cycle is spent at positions other than digging in the bank that an acute sense is necessary to coordinate the hoist, swing and crowd control components so that no time will be lost in the dipper travel from one position to another. Since the coordinating ability of shovel operators may vary greatly, the difference in the work output for a given shovel can vary greatly. Modern shovel control systems generally utilize speed or voltage regulators with current limit. With such a type of control, the operator is able to rely on a given constant speed for a specific position of a controller master switch. When digging in the bank however, the machinery is forced to operate on the slope of the volt-ampere curve so that for a given master switch position, the restraining effort exerted by the material in the bank will have a direct effect on the speed of the dipper. Thus the dipper speed when digging, which is a combination of hoisting and crowding, is not governed solely by the controller setting. The operator is required to constantly change the hoist and crowd controlling switches with relation to each other to follow the digging path desired and to counteract for changing resistive loads while going through the bank. The problem of coordination is quite complex.

An object of the present invention is to provide a mimic positioning control system for a power shovel which is far simpler, easier to coordinate, and less fatiguing to the operator than the conventional method.

Another object of the present invention is to provide a mimic positioning control system capable of mimicking and controlling the position of a controlled device.

Another object of the present invention is to provide a mimic positioning controller capable of simulating the position of the controlled member and apply a control signal that is functionally related to the indicated position of the controlled member.

Another object of the present invention is to provide a mimic positioning control system capable of simulating the position of the controlled device and apply a signal related to the relative position of a controlling member to the simulated position of the controlled device.

Another object of the present invention is to provide a mimic positioning control system wherein a reference point on a small scale mimic mechanism will duplicate at all times the equivalent position of the controlled device.

Another object of the present invention is to provide a mimic motion in a mimicking positioning control system for a controlled device wherein the operator need only concentrate on the position of the controlled device as required in any instant instead of coordinating and adding the hoist and crowd control components through movements of both hands while at the same time controlling the swing control component with his foot.

Further objects and advantages of the present invention will be readily apparent from the following detailed description taken in conjunction with the drawings, in which.

Figures 1, 3:
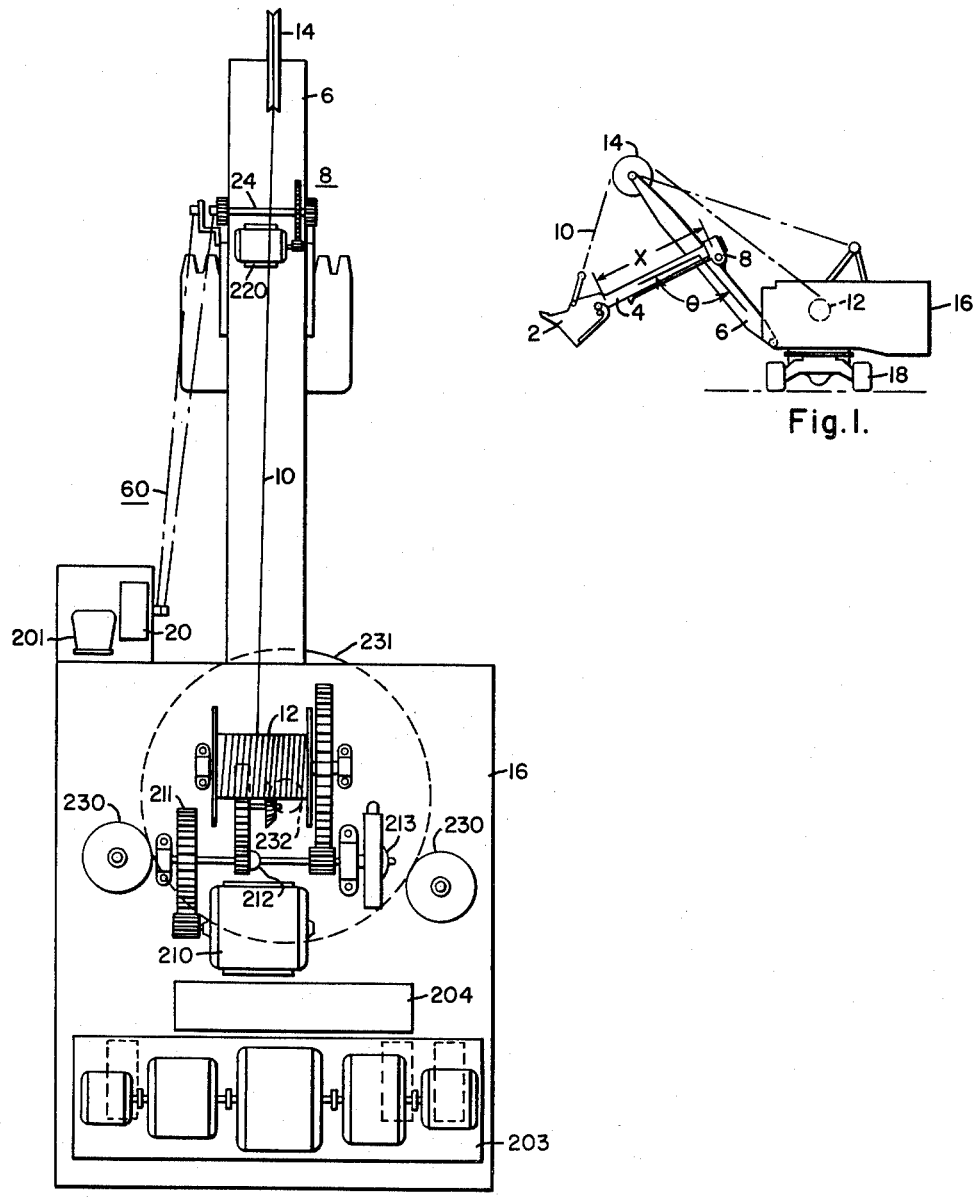
FIGURE 1 is an elevational view of a loader type shovel embodying a controller in accordance with the present invention.
FIGURE 3 is a layout diagram illustrating the location of electrical apparatus for a loader type shovel in accordance with the present invention.

FIGURE 1 illustrates a loader type shovel. To further the understanding of the present invention, operation of a loader type shovel will be briefly described. A dipper 2 and dipper handle 4 is adapted to move relative to a boom 6 by means of a crowding mechanism 8. The crowding mechanism 8 is capable of moving the dipper handle in and out thereby varying the dipper handle extension indicated as the dimension X on the dipper handle 4. The movement of the dipper handle relative to the boom 6, as measured by the dipper handle extension X, will be hereinafter referred to as the crowd motion or crowd control component. To hoist the dipper 2, a hoist cable 10 is secured to the dipper 2 and wound on a hoist drum 12 after passing over a boom point sheave 14 located at the outer end of the boom 6. The movement of the dipper in the vertical direction will hereinafter be referred to as the hoist motion or hoist control component. The dipper 2 can be swung around by rotating the cab 16 relative to the crawler assembly 18 when it is desirable to move the dipper for instance, from one digging position to another or to an unloading point. The motion of the dipper in this manner will hereinafter be referred to as the swing motion or swing control component. It is to be noted that the three motions of the dipper at any instant are at right angles to each other. As previously mentioned, conventional control apparatus for such a shovel requires the operator to coordinate each of the control components by changing the position of separate control switches and involves a great deal of dexterity.

The present invention provides a far more simple method of control by concentrating only on the dipper position itself as required at any instant. It can be seen that the position of the dipper 2 can be readily determined by sensing the magnitude of the dipper handle extension X and also sensing the dipper handle hoist angle $\theta$, which is the angle subscribed by the dipper handle 4 and the boom 6. By sensing the extension X and the angle $\theta$ the exact position of the dipper 2 with respect to its crowd and hoist motions can be accurately determined. The crowd and hoist components of the dipper 2 could also be sensed by measuring drum rotations or length of hoist cable but by such measurement when the shovel cable is replaced, the equivalent members may not be properly realigned relative to each other to provide in a way compatible with the shovel utilizing the previous cable. It is to be seen that by sensing the dipper handle extension and the dipper handle hoist angle $\theta$ that the shovel cable may be changed without requiring a realignment of the working members to determine the position of the dipper 2 as would be required when sensing the position of the dipper 2 by means of a cable length 10 or number of drum rotations of the hoist drum 12.

Figure 2:
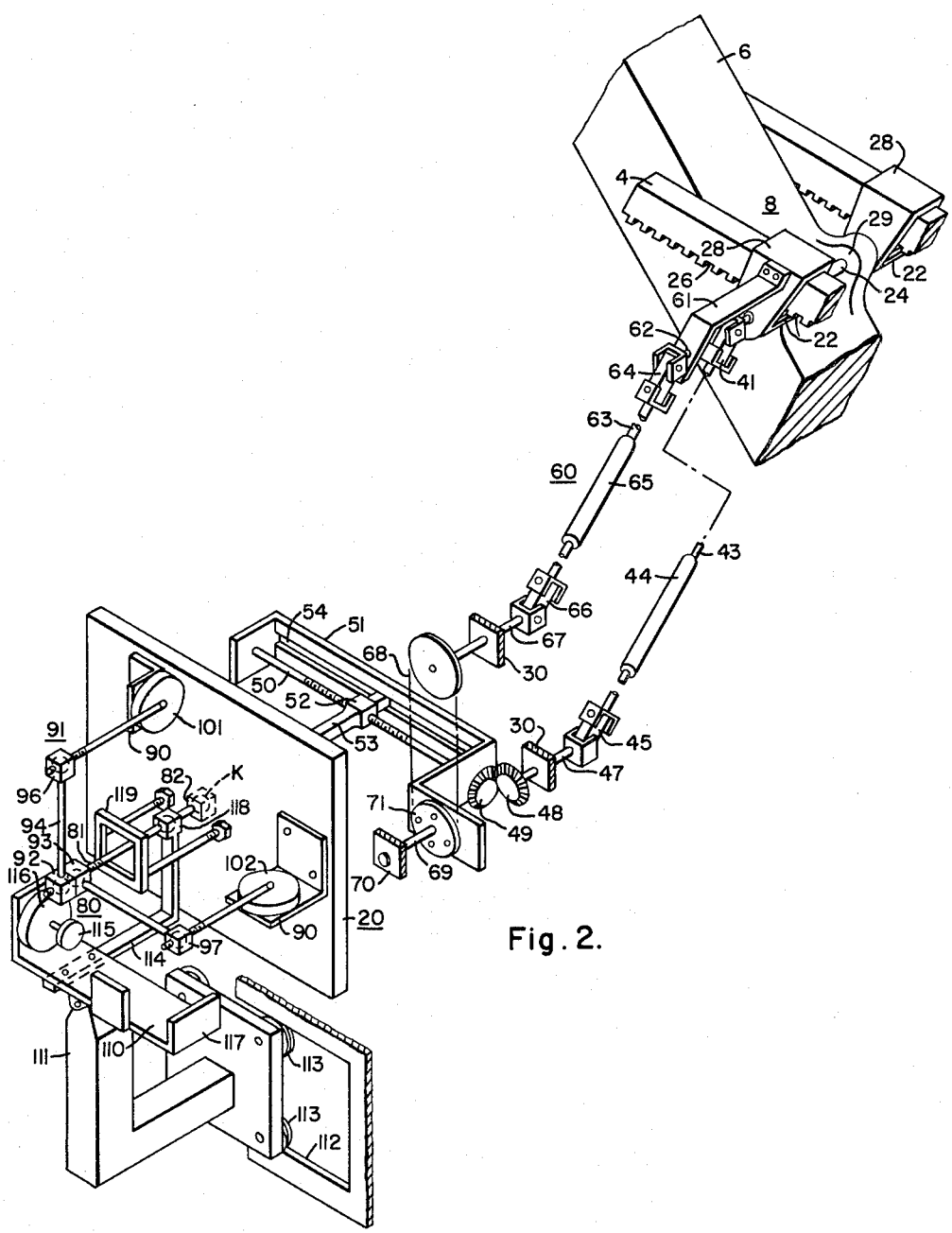
FIGURE 2 is a perspective view of an illustrative embodiment of a mimic positioning controller in accordance with the present invention.

The mimic positioning controller in accordance with the present invention can be best understood by describing how the controller mimics the position of the dipper 2 when used in a loader type shovel. In order to utilize the principle of mimic motion control, a small scale facsimile of the dipper 2 and dipper handle 4 is assembled immediately adjacent the side of the operator seat. By means of mechanical followers as shown in FIGURE 2, the scale model dipper and dipper handle are caused to follow the immediate, exact position of the controlled dipper 2. Thus, a point K can be located on the small scale movable member that at all times assumes the exact equivalent position of the controlled dipper 2 in the hoist-crowd, vertical plane. At the equivalent dipper position K, a spring centered stick type dual directional arm is located. The arm is positioned to lie in a horizontal plane parallel to the front of the shovel cab. Movement of the arm separates the required direction of travel of the controlled dipper 2 into separate hoist and crowd control components as required at any instant. The separate hoist and crowd control component signals are fed into an amplifier arrangement which in turn pass the amplified signals to the main motion generators and their respective motors for driving the controlled dipper 2 to its newly desired position.

Such a mimic positioning control system is illustrated in FIGURE 2.

The controller comprises generally a small scale facsimile or a movable member 20 which simulates the position of the controlled dipper 2 as determined by dipper handle extension sensing means 40 and dipper handle hoist angle sensing means 60. A signal input means 80 including a controlling member 81 provides hoist and crowd control components to electrical control means 90 by means of a motion transfer mechanism 91. The electrical control means 90 in turn pass on the signal through amplifiers to the main motion generators and then to the respective drive motors which drive the controlled dipper.

Rack pinions 22 mounted on a shipper shaft 24 engage a rack 26 integral with the dipper handle 4 to move the dipper handle 4 in and out relative to the boom 6. A crowd knuckle or yoke block 28 mounted at each end of the shipper shaft 24 holds the rack 26 in captive engagement with the rack pinions 22 as the dipper handle extension X is varied. The crowd mechanism 8 is fixedly secured to the boom 6 by pedestals 29 which hold the shipper shaft 24 captive at a fixed point on the boom 6.

The dipper handle extension sensing means 40 determines the amount of dipper handle extension X by linking the rotation of the shipper shaft 24 to the movable member 20. The mechanical linkage is accomplished by a universal joint 41 transmitting the rotation of the shipper shaft 24 to a crowd transmitter shaft 43. A splined joint 44 transmits rotation of the crowd transmitter shaft 43 to a universal joint 45. A short shaft 47 connected to transmitter shaft 43 enters the side wall 30 of the shovel cab and, in turn, drives beveled gears 48 and 49 positioned to transmit the rotation of the short shaft 47 at right angles, or any other suitable angle, to a threaded shaft 50. The threaded shaft 50 is rotatably mounted within a U-shaped bracket 51. A traveling nut 52 is mounted on the threaded shaft 50 and is adapted to travel along the threaded shaft 50 in response to the rotation of the beveled gear 49. An arm 53 related with the traveling nut 52 connects at one end thereof the movable member 20 to the traveling nut 52 and thereby moves the movable member 20 back and forward in response to the rotation of the shipper shaft 24. The opposite end of the arm 53 is keyed into a slot 54 to prevent rotation of the movable member 20 with the threaded shaft 50.

The dipper handle hoist angle sensing means 60 transmits the angle $\theta$ to the movable member 20 so that the movable member 20 will assume a position in accordance with the relative position of the dipper handle 4 to the boom 6. To measure the angle $\theta$, a point on the yoke 28 is selected which rotates about the shipper shaft 24. As the selected point rotates about the axis of the yoke 28 the angle of rotation is transmitted by an L-shape member 61 secured to the selected point on the yoke 28. The other leg of the L-shape member 61 rotates a connecting rod 62 through the same angle from whence the angle is transmitted to a hoist transmitter shaft 63 by means of the universal joint 64. A splined joint 65 connects the transmission of the hoist angle $\theta$ to another universal joint 66 and, in turn, to a short shaft 67 which enters the side wall 30 of the cab 16. A chained sprocket drive 68 transmits the hoist angle to the U-shaped member 51 by causing rotation of a short drive shaft 69 rotatably supported in a structural member 70 at one end and fixedly secured to the U-shaped member 51 at the other end so that rotation of the lower sprocket 71 will cause the U-shaped member 51 to correspondingly move about the short drive shaft 69. Movement of the U-shaped member 51 is, in turn, transmitted to the connecting rod 53 causing the movable member 20 to assume a position in accordance with the dipper handle hoist angle $\theta$ transmitted by the sensing means 60.

Thus, it is readily apparent that the movable member 20 mimics the position of the controlled dipper 2 by responding to the dipper shaft extension X and the dipper handle hoist angle $\theta$. A point K on the movable member 20 is chosen to designate or simulate the controlled dipper 2 and it can be seen by means of the sensing means 40 and 60 that the point K on the movable member 20 mimics the dipper position at all times. In this manner the operator has a reference point within the cab of the shovel which provides an exact indication of the position of the controlled dipper 2.

The controlling member 81, in the form of an arm, is pivotally mounted at point K by means of a ball and socket connection 82 and is positioned perpendicular to the plane of the movable member 20. The motion transfer mechanism 91 is operably secured to the opposite end of the arm 81 by ball and socket connections 92 and 93 having connecting rods 94 and 95 disposed at right angles to each other; namely, the rod 95 which is parallel to the dipper arms 4 and 94 which is perpendicular to the dipper arm 4. At opposite ends of the connecting rods 94 and 95 are ball and socket joints 96 and 97 which transmit the movement of the arm 81 to the electrical control means 90.

Electrical control means 90 is illustrated to be rheostats 101 and 102 designated as the hoist rheostat and crowd rheostat, respectively. Each rheostat is center tapped with a spring centered wiper arm which is adapted to travel on either side of neutral and provide a signal related to the displacement of the wiper arm from center. The signal input means 80 provides hoist and crowd signal components to the electrical control means 90 by means of the motion transfer mechanism 91. It is to be noted that the signal components are related to the position of the movable member 20 as it mimics the location of the controlled dipper 2.

When moving the controlling member 81 in a direction perpendicular to the dipper handle 4, only the hoist rheostat 101 will be actuated. When moving the controlling member 81 in a direction parallel, or in line with the dipper handle 4, only the crowd rheostat 102 will be initiated. When moving the controlling arm 81 in any other direction, not specifically in line with the hoist or crowd motion, the controlling member will divide up the motion into the separate required hoist and crowd control components to the power means driving the dipper 2.

Movement of the controlling member 81 relative to the movable member 20 provides separate hoist and crowd component signals which have a magnitude directly related to the displacement of the controlling member 81 from the movable member 20. As the controlled dipper 2 advances to the desired position the sensing means 40 and 60 transmit the position of the dipper to the movable member 20 thereby causing the point K to realign itself with the controlling member 81, diminishing the magnitude of the signal as the point K more closely aligns itself with the new position of the controlling member 81.

It is important to note that a full hoist or lower, or crowd in or crowd out signal can be obtained by displacing the controlling member 81 from the movable member 20 by a relatively small amount. An operator in a seated, fixed position can easily move the controlling member 81 in a vertical plane to cover all the required equivalent hoist-crowd position points of the controlled dipper 2.

To eliminate fatigue that might be involved in a lifting motion required to trace the hoist-crowd path, the operator's hand does not grab the controlling member 81 directly. Instead, the controlling member 81 is affixed by means of an L-shaped member 114 and the ball and socket joint 118 to one side of a teeter totter type arm rest 110 on which the operator's right forearm is placed. The L-shaped member 114 makes connection to the controlling member 81 at a point slightly displaced from the ball and socket connection 82. The arm rest 110 is supported on a member 111 supported by a track 112 and allowed to move in a horizontal plane along the track 112 by rollers 113 secured to the member 111. The arm rest 110 pivots about a surface of said member 111 in a teeter totter manner and supports the operator's forearm. Thus, the operator's forearm moves in connecting rod type fashion as the palm of the operator's hand goes through the required, small scale, hoist-crowd path.

In a sense, the operator as he cups his hand to grip the control knob 115 forms a simulated dipper which he may come to think of as the controlled dipper 2. Point K, the movable member 81, the L-shaped bracket 114 and the control knob 115 lie in the same plane providing simulation of the controller dipper 2 within the palm of the operator's hand as to hoist and crowd movements. The back end of the arm rest 110 may be counterweighted at 117 to balance the unit including the operator's forearm. Since the operator's palm position describes the required hoist-crowd path, the right-hand fingers of the operator are free to rotate a control knob 115. The control knob 115 varies the resistance of a transmitter synchrotie 116 mounted at the front end of the arm rest 110. The synchrotie 116 provides control means for the operator to furnish, by hand manipulation, a swing control component to rotate or swing the controlled dipper 2 and the entire boom assembly 6 about the crawler 18. Thus, any required swing arc to 180° can be preset for programmed control through the dipper swing flight.

The amount of effort exerted by the operator to give full signal power to either the hoist, swing or crowd motion is measured in ounces and, in movement, distances of approximately one-quarter of an inch maximum. For instance, if the member 51 is approximately 13 inches long, the total movement required of the operator's hand would be approximately 20 inches, to move the dipper from a position down close to the crawlers 18 to its maximum hoist and crowd height. The maximum discrepancy for maximum power signal of the operator's wrist from the true position of the controlled dipper 2 would be within one-quarter of an inch. A retaining frame 119 secured to, but displaced from, the movable member 20, is employed to prevent the operator's wrist movement from obtaining any greater discrepancy from the equivalent dipper position.

It is to be noted that to operate a conventional power shovel with separate motion controls, the operator not only has to initiate the speed signals at the correct time and in varying degrees, but he also has to cancel each signal with the same discretion. In accordance with the present invention, the shovel operator indicates direction of dipper travel only. The controlled dipper 2 follows the movement of the operator's right hand. Here the dipper advances and falls back from the speed indicated automatically. The mimic positioning controller also allows use of maximum dipper speeds from one point to another because the relative component speeds are automatically obtained; limited only by the maximum speed of the component which demands the greatest speed to move between given position points. In contrast, with conventional control arrangements an operator might limit all speed components to allow proper coordination among the hoist, crowd and swing motions.

Figure 4:
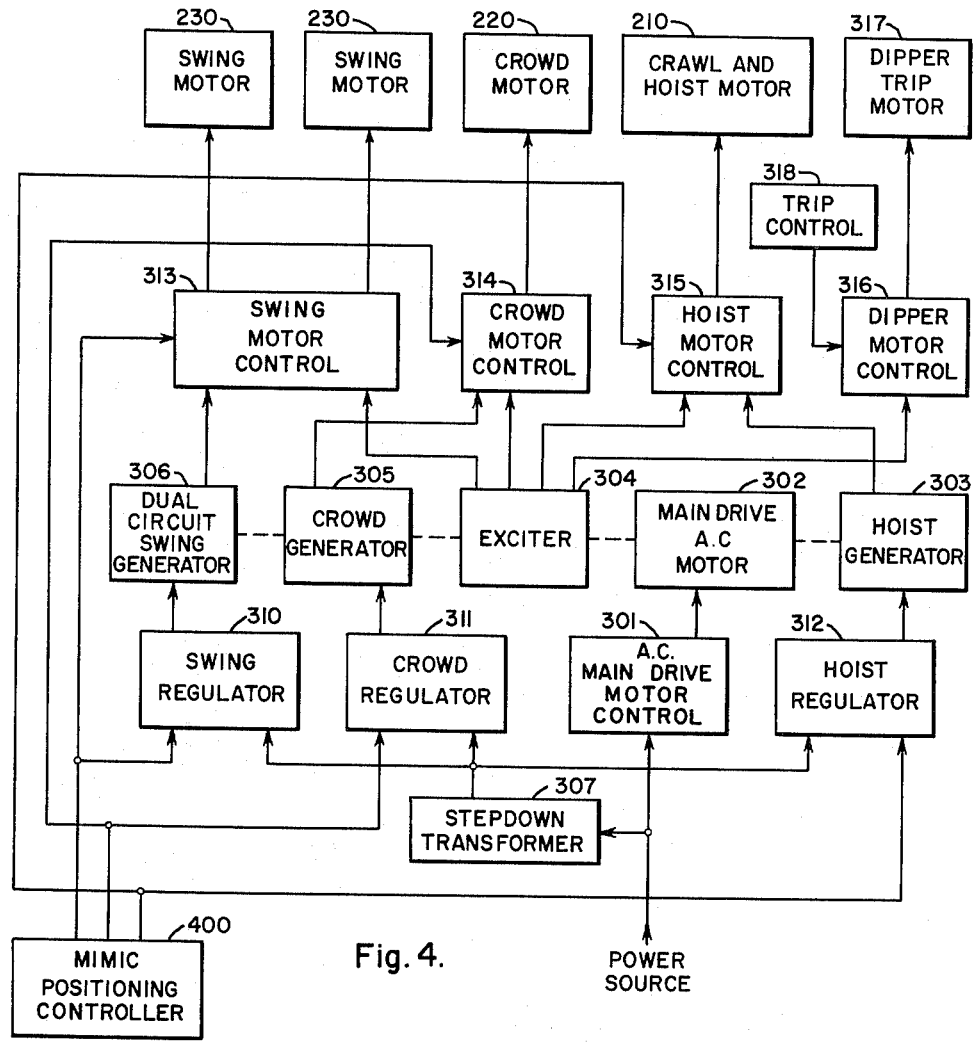
FIGURE 4 is an electrical block diagram of the apparatus shown in FIGURE 3.

FIGURES 3 and 4 illustrate the physical location of the electrical apparatus controlled by the mimic positioning controller.

Referring to FIGURE 3, it can be seen that the movable member 20 of the mimic positioning controller is positioned within operator's compartment of the shovel cab 16 adjacent and to the right of the operator's seat 206. A special power supply for driving the shovel is provided by means of the tandem connected motor generator set 203. Electrical control apparatus 204 varies power to the driving motors from the generators in accordance with the operator's manipulating of the mimic position controller.

The disposition of the driving motors is in accordance with conventional practice. The hoist motor 210 drives a gear arrangement 211 which will drive the hoist drum 12 and hence wind up the hoist cable 10 over the hoist sheave 14. In this manner the dipper handle hoist angle $\theta$ is varied as hereinbefore described.

A crowd motor 220 positioned in the crowding mechanism 8 located on the boom 6 is adapted to engage the shipper shaft 24 and hence alter the dipper handle extension X as heretofore described.

Swing motors 230 are positioned to engage the main rotating gear 231 which in turn is adapted to rotate about the main rotating pinion 232 and thereby swing the cab 16 about the crawler assembly 18. The swing motors 230 control the position of the cab 16 and hence the position of the controlled dipper 2 in accordance with the operation of the operator's right hand in turning the swing control knob 115.

Referring to FIGURE 4, it can be seen that a power source connected to the loader type shovel provides power to the alternating current main drive motor control 301 which in turn controls the main drive alternating current motor 302. The main drive motor 302 is tandem connected on the motor generator bed plate to drive a hoist generator 303, an exciter 304, a crowd generator 305, and a dual circuit swing generator 306.

A step down transformer 307 reduces the voltage from the power supply for connection to each separate motion regulator. The regulators shown are: The swing regulator 310, a crowd regulator 311 and a hoist regulator 312 respectively.

The swing regulator 310 in turn provides excitation to the dual circuit swing generator 306 in turn powering the swing motors 230 through the swing motor control 313.

The crowd generator 305 provides power to the crowd motor 220 through the crowd motor control 314.

The hoist generator 303 provides power to the crawl and hoist motor 210 through the hoist motor control 315.

The exciter 304 provides excitation to each of the swing motor control 313, crowd motor control 314, and hoist motor control 315 as well as a dipper motor control 316. Dipper motor 317 (illustrated only in FIGURE 4) allows control of the opening and closing of the dipper jaw to load and unload the controlled dipper 2. A trip control 318 provides means for the unlocking of the jaw of the controlled dipper 2.

The mimic positioning controller 400 provides a crowd component control signal to the crowd motor control 314 and crowd regulator 311 in accordance with the displacement of the wiper arm of the rheostat 102. The crowd motor 202 in turn advances or retracts the dipper handle 4 with respect to the boom 6 thereby altering the dipper handle extension X.

A hoist control component signal is provided from the mimic positioning controller 400 to the hoist motor control 330 and hoist regulator 312 which in turn controls the motor 210. The magnitude of the hoist control component is determined by the displacement of the wiper arm of the rheostat 101. The greater the displacement of the wiper arm the greater the amplitude of the signal. In this manner, the dipper handle hoist angle is varied in accordance with the operator's displacement of the controlling member 81 relative to the movable member 20.

A swing component signal is provided to the swing motor control 313 and swing regulator 310 in accordance with the setting of the control knob 115.

Figure 5:
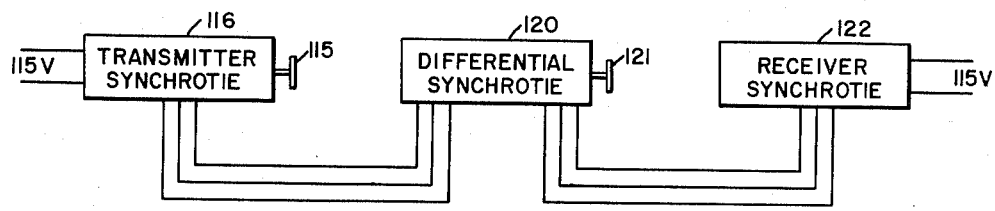
FIGURE 5 is an electrical block diagram of other apparatus in accordance with the present invention.

From FIGURE 5, the transmitter synchrotie 116 is connected into a differential synchrotie 120. A receiver synchrotie 122 positioned between the rotatable upper frame or cab 16 and the crawler assembly 18 of the shovel cab 16 indicates the actual swing position of the controlled dipper 2. The actual position is compared with the position of the control knob 115. The differential synchrotie 120 sets the swing rheostat 121 accordingly.

The present invention is capable of sensing the position of a controlled device such as a controlled dipper and, in turn, providing actuating signals for changing the position of the dipper in accordance with the relation between the controlling member and the actual position of the controlled dipper. In conclusion, it is to be pointed out that the mimic positioning controller is equally applicable to any arrangement wherein simulated positioning of the controlled device is desired and control of said controlled device is desired relative to the position of the controlled device as mimicked by a movable member.

While the present invention has been described with a degree of particularity for the purposes of illustration, it is to be understood that all equivalents, alterations, and modifications within the spirit and scope of the present invention are herein meant to be included.

Mechanical transmission means have been illustrated for sensing the position of the controlled dipper and passing such information on to a movable member 20. However, it is to be understood that pneumatic means, synchronizing means, wound rotor gear motor means and other equipments may be used to sense the position of the controlled dipper.

I claim as my invention:

1. A controller for a shovel including a dipper and a dipper handle comprising, means for sensing the dipper handle hoist angle; means for sensing the dipper handle extension; movable means operably connected to said first and second means for mimicking the movements of said dipper; a controlling member adapted to be moved relative to said movable means and provide a signal for changing the position of said dipper as a function of the position of said controlling member with respect to said movable means; and power means responsive to said signal for changing the hoist angle and extension of said dipper handle.

2. A controller for a shovel including a dipper and a dipper handle comprising, means for sensing the dipper handle hoist angle; means for sensing the dipper handle extension; indicating means operably connected to said first and second mentioned means for mimicking the position of said dipper; actuating means secured to said indicating means and adapted to provide an input signal as a function of the relative change in position between said actuating means and said indicating means for changing the position of said dipper from its existing position; and power means responsive to said signal for changing the hoist angle and extension of said dipper handle.

3. A controller for a shovel including a dipper and a dipper handle comprising, means for sensing the dipper handle hoist angle; means for sensing the dipper handle extension; indicating means operably connected to said first and second mentioned means for mimicking the position of said dipper; actuating means secured to said indicating means and adapted to provide an input signal as a function of the relative change in position between said actuating means and said indicating means for changing the position of said dipper from its existing position; means for resolving said input signal into a hoist component and a crowd component; and power means responsive to each said component for changing the hoist angle and extension of said dipper handle.

4. A controller for a shovel including a dipper comprising, in combination, power means for driving said dipper; a movable member adapted to mimic the position of said dipper; an arm pivotally mounted at one end to said movable member; and position responsive electrical control means operably connected to the opposite end of said arm for providing a signal to said power means in response to the displacement of said arm from a predetermined position with respect to said movable member.

5. A controller for a shovel including a dipper comprising, in combination, power means for driving said dipper; a movable member adapted to mimic the position of said dipper; an arm pivotally mounted at one end to said movable member and spring center to be perpendicular to the plane of said movable member; connecting means secured at the opposite end of said arm for translating the motion of said arm into a vertical component and a horizontal component; and transducer means for transforming the vertical component and horizontal component of the motion of said arm into electrical signals, namely, a hoist signal and a crowd signal respectively; said power means being responsive to each said component for changing the position of said dipper.

6. The controller of claim 5 including a means for displacing said arm from its position perpendicular to said movable member; said means comprising an arm rest adapted to move in a plane parallel to said movable member; said arm rest being supported on a surface for pivoting thereabout; and means for connecting a point displaced from said surface on said arm rest to said arm whereby the movement of said point is transferred to said arm; the movement of said arm from its perpendicular position with respect to said movable member providing input means to said position responsive electrical control means controlling said power means to move the dipper.

7. A controller for a shovel including a dipper comprising, in combination; power means for driving said dipper; a movable member adapted to mimic the position of said dipper; an arm pivotally secured at one end to said movable member; a hoist rheostat and a crowd rheostat secured to said movable member; motion transfer means connecting the opposite end of said arm to said hoist rheostat and said crowd rheostat whereby the motion of said opposite end is resolved into a hoist signal component and a crowd signal component; said component signals being at right angles to each other; said power means changing the hoist position and the crowd position of said dipper in response to said component signals.

8. The controller of claim 7 in which a retaining frame is displaced a fixed distance from said movable member and encompasses said arm to limit the amount of displacement of the opposite end of said arm relative to said movable member.

9. A controller for a shovel including a dipper comprising, in combination, power means for driving said dipper; a movable member adapted to mimic the position of said dipper; an arm pivotally mounted at one end to said movable member and having a normal position perpendicular to the plane of said movable member; a fulcrum member having a fulcrum point adapted to move in a plane parallel to said movable member; a lever pivotally secured to said fulcrum member at said fulcrum point; said lever secured to said arm at a point displaced from said fulcrum point whereby the movement of said lever in said plane parallel to said movable member and about said fulcrum point is transmitted to said arm; and position responsive electrical means operably connected to the opposite end of said arm for providing a signal to said power means in response to displacement of said arm from its normal perpendicular position with said movable member.

10. A controller for a shovel including a dipper and a dipper handle, a shipper shaft and a yoke securing said shipper shaft and positioning the dipper handle on a boom for racking the dipper handle in and out from the boom, comprising, means for sensing the dipper handle hoist angle; means for sensing the dipper handle extension; a movable member operably connected to said first and second mentioned means for mimicking the position of said dipper; said means for sensing the dipper handle hoist angle comprises an angle member secured at one end to said yoke at a point displaced from the shipper shaft about which the yoke pivots; a chain driven sprocket drive; a connector transmitting the angle through which the yoke is rotated to said chain driven sprocket drive by connecting the motion of said yoke about the shipper shaft to said movable member; actuating means secured to said movable member and adapted to provide an input signal as a function of the relative change in position between said actuating means and said movable member for changing the position of said dipper from its existing position; and power means responsive to said signal for changing the hoist angle and extension of said dipper handle.

11. A controller for a shovel including a dipper and a dipper handle, a shipper shaft and a yoke securing said shipper shaft and positioning the dipper handle on a boom for racking the dipper handle in and out from the boom, comprising, means for sensing the dipper handle hoist angle; means for sensing the dipper handle extension; indicating means operably connected to said first and second mentioned means for mimicking the position of said dipper; said means for sensing the dipper handle extension comprising a connector; means secured to said shipper shaft for transferring the rotating motion of said shipper shaft to said connector as the dipper handle moves relative to said boom; means for connecting the motion of said connector to a threaded drive shaft; a traveling nut mounted on said threaded drive shaft and adapted to move along said threaded shaft in response to the rotation of said threaded shaft; and means for connecting said movable member to said traveling nut whereby the position of said movable member with respect to said threaded shaft will simulate the position of said dipper handle with respect to said shipper shaft; actuating means secured to said indicating means and adapted to provide an input signal as a function of the relative change in position between said actuating means and said indicating means for changing the position of said dipper from its existing position; and power means responsive to said signal for changing the hoist angle and extension of said dipper handle.

References Cited in the file of this patent

UNITED STATES PATENTS

| 2,700,828 | Barnes | Feb. 1, 1955 |
| 2,858,947 | Chapman | Nov. 4, 1958 |
| 2,861,699 | Youmans | Nov. 25, 1958 |
| 3,047,167 | Rose | July 31, 1962 |

FOREIGN PATENTS

| 1,082,718 | Germany | June 2, 1960 |